E. BERLINER.
Assignor to THE NATIONAL BELL TELEPHONE COMPANY.
Telephone.
No. 9,499.
Reissued Dec. 14, 1880.
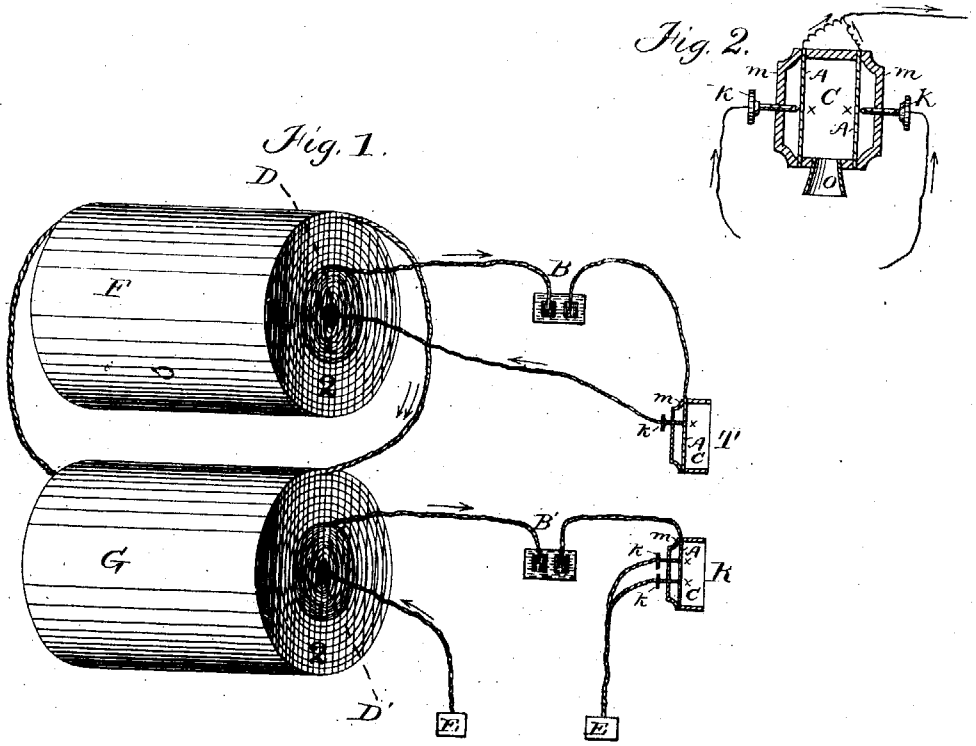
Witnesses.
Geo. Willis Pierce.
Percy R. Templer
Inventor.
Emile Berliner

UNITED STATES PATENT OFFICE.

EMILE BERLINER, OF BOSTON, MASSACHUSETTS, ASSIGNOR TO THE NATIONAL BELL TELEPHONE COMPANY, OF SAME PLACE.

TELEPHONE.

SPECIFICATION forming part of Reissued Letters Patent No. 9,499, dated December 14, 1880.

Original No. 199,141, dated January 15, 1878. Application for reissue filed October 23, 1880.

*To all whom it may concern:*

Be it known that I, EMILE BERLINER, of Boston, Massachusetts, have invented certain new and useful Improvements in Electrical Telephony, of which the following is a specification.

In an application for Letters Patent made by me June 4, 1877, I have shown how sound may be transmitted and reproduced by means of a vibratory metal or carbon plate in contact with a metal or carbon pin so arranged in an electric circuit that a constant current, as from a battery, passes through the points of contact which formed part of that circuit. The impact of sound-waves upon said plate in the transmitter caused it to vibrate, and thus either broke the contact, or, in case where the transmission of articulate speech was required, alternately weakened and strengthened the same at each vibration of the plate, thereby varied the electrical resistance of the contact, and thus varied the strength of the current which was passing this varying point of contact. The reproduction of sound was also to be effected with this form of instrument by permitting a current consisting of electric waves to pass through a similar receiving-instrument, composed, also, of a metal or carbon plate in a vibratory position, in contact with a metal or carbon pin. As shown in said application, each electric wave passing over the point of contact would cause a recoiling of the plate from the pin, thereby producing an air-wave, and as the electric waves would follow one after the other in exact accordance with the sound-waves which acted on the transmitter to throw the electric current into waves, the air-waves or vibrations produced by the receiving-instrument occurring at the same rate and measure would therefore reproduce the same tone that effected the transmitter; but when sound is transmitted by varying the intensity of the current by means of this transmitter without interrupting the same—namely, by merely weakening or strengthening the contact at each vibration, and thereby weakening and strengthening the current—the effect on the receiving-instrument is not very strong, and particularly where a long circuit is employed the effect is but feeble.

My present invention relates to an arrangement of circuits and currents which will materially assist to remedy the weakness mentioned.

In the drawings, Figure 1, R is a telephone-receiver, consisting of a metal or carbon plate, A, in contact with the metal or carbon pins or screws *k k*, and mounted on the box or tube *c*, while the screws are held in position by the insulating-bar *m*. T is a telephonic transmitter, consisting, also, of a vibratory plate, A, in contact with the pin *k*. T is situated in the primary circuit of the inductorium F, which also includes the battery B. R is situated in the primary circuit of the inductorium G, which also includes its battery B′. The secondary coils of these two induction apparatus are connected so as to form one closed secondary circuit common to both. When, now, the impact of sound-waves on the plate of the transmitter T causes a weakening and strengthening of the contact at each vibration, and thereby a weakening and strengthening of the current, the full effect of this variation will be felt in all parts of the shorter circuit in which T is placed, without that feebleness or want of extent in the variation which is the result of so operating the transmitter in a long circuit, and which correspondingly enfeebles the results produced in the receiver. The induction-coil provided with the core D, as usual, is an apparatus in the secondary circuit of which the variations of the currents correspond in their extent and violence to the extent of the variations in the primary current. Thus the wide range or extent of variation which is received in the circuit where the transmitter is, by making that circuit very short, is reproduced in a secondary circuit of great length, and without the fading away of the variations, due to the action of the transmitter, which would take place if it were placed in a long direct circuit leading to the distant station. Every variation in the secondary circuit is, in like manner, by means of the inductorium G, propagated into a variation of corresponding extent in the circuit which contains the receiver R, and which is the primary circuit of said coil G, but the tertiary circuit considered with reference to the transmitter T. That circuit, which is also short, is easily supplied with the requisite current by its own local battery, without the expense of large battery-power, which would be required if the circuit of the receiver were supplied by a battery from the transmitting-station, the effect of which would be materially weakened by the distance. The current from this battery is constant; but the induced currents in this tertiary circuit are alternately added to it and subtracted from it, so that the extent of variation therein is substantially the same as that which would be obtained if the receiver R were placed in immediate proximity to the transmitter T, and in the same short circuit. Where R is used as a transmitter and T as a receiver, the two induction apparatus enable the same operation to be repeated in the inverse direction. The variations of current caused by the transmitter T in its own circuit thus operate to cause variations of current of corresponding magnitude in the secondary circuit, and thereby to produce magnetic changes of corresponding extent in the core D, which is included in the coil that forms part of said circuit. It is immaterial to the operation of this part of the apparatus how those changes of magnetism in this core D are utilized, and my apparatus and combination may be applied to other kinds of telephones than those described therein, and is also subject to changes of form, place, or arrangement, and so far as the operation of the transmitter T is concerned, the inductorium G, if its two coils be suitably proportioned, may be placed anywhere between F and the receiving-instrument; but the receiver described is used with the greatest economy when the tertiary or receiving circuit, which is D, is supplied by the local battery, being itself merely local, and my arrangement enables this to be done.

In Fig. 2 is shown a modification of the telephone, in which there is a box or tube closed by the two vibratory plates in contact with the pins *k k*, both contacts becoming affected simultaneously by electrical waves passing over them. The effect is similar to that described in the telephones, Fig. 1.

I do not claim, broadly, the combination, in the telegraphic circuit, of two or more tympans, a resonant box, and one or more circuit-closers to each tympan, when such an arrangement is used for a transmitter of sound only; and I do not claim the use of an induction-coil in an apparatus which operates by interrupting the current; but What I do claim is—

1. A telephonic receiving-instrument consisting of a vibratory plate of metal or carbon, forming one pole or end of a galvanic current, arranged in contact with several metal or carbon pins, which together form the opposite pole of the same current, for reproducing sound.

2. A telephonic receiving-instrument consisting of two metal or carbon plates in a vibratory position, each in contact with a metal or carbon pin, arranged in such a manner that both contacts are affected simultaneously by the same electric waves.

3. A combination of two induction apparatus with two separate battery-circuits, one of each passing through one of the primary coils, the secondaries of which are combined into one closed circuit with the iron cores, for the purpose described.

4. A mode of transforming sound-waves of induced or tensional electricity into sound by permitting them to act by induction upon a continued galvanic current, which passes through a vibratory medium, forming one pole, and being in contact with the opposite one of the said same galvanic current.

5. The telephonic receiving-instrument situated within a continued galvanic circuit, in which undulations are produced by the inductive undulatory currents of another electric circuit.

6. A telephonic transmitter which operates to vary the resistance of the circuit in which it is placed without interrupting it, in combination with a local battery, a short primary circuit of an inductorium which includes both, and a secondary circuit of said inductorium proceeding toward the distant station.

7. A combination of a primary circuit with a closed secondary circuit and a grounded tertiary circuit in which electrical undulations are produced by induction from the undulatory currents of the primary electric circuit.

In testimony whereof I have signed this specification in the presence of two subscribing witnesses.

EMILE BERLINER.

Witnesses:
ALFRED J. MAYO,
C. H. GREAVES.